United States Patent
Hanker et al.

(10) Patent No.: US 12,123,492 B2
(45) Date of Patent: Oct. 22, 2024

(54) DRIVE ARRANGEMENT FOR A VEHICLE

(71) Applicant: ZF FRIEDRICHSHAFEN AG, Friedrichshafen (DE)

(72) Inventors: Gert Hanker, Meckenbeuren (DE); Sven Holst, Meckenbeuren (DE); Robert Nickel, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/571,081

(22) PCT Filed: Jun. 23, 2022

(86) PCT No.: PCT/EP2022/067199
§ 371 (c)(1),
(2) Date: Dec. 15, 2023

(87) PCT Pub. No.: WO2023/274841
PCT Pub. Date: Jan. 5, 2023

(65) Prior Publication Data
US 2024/0280175 A1 Aug. 22, 2024

(30) Foreign Application Priority Data
Jun. 29, 2021 (DE) ...................... 10 2021 206 734.4

(51) Int. Cl.
*B60K 1/02* (2006.01)
*F16H 63/34* (2006.01)
*B60K 7/00* (2006.01)

(52) U.S. Cl.
CPC ............ *F16H 63/3466* (2013.01); *B60K 1/02* (2013.01); *B60K 2007/0061* (2013.01); *B60K 2007/0092* (2013.01)

(58) Field of Classification Search
CPC .................. F16H 63/3466; B60K 1/02; B60K 2007/0061; B60K 2007/0092
See application file for complete search history.

(56) References Cited

U.S. PATENT DOCUMENTS 8,641,568 B2    2/2014  Knoblauch et al.
10,611,260 B2 * 4/2020  Nasu ................... B60L 15/2036
(Continued)

FOREIGN PATENT DOCUMENTS

CN    105459781 A  *  4/2016
DE    102011086743      5/2013
(Continued)

OTHER PUBLICATIONS

Office Action of corresponding German Patent Application No. DE 10 2021 206 734.4.

*Primary Examiner* — Justin Holmes
(74) *Attorney, Agent, or Firm* — Cozen O'Connor

(57) ABSTRACT

A drive arrangement for a vehicle, having a first electric machine connected to a first gear unit (3a) for driving a first wheel of the vehicle, a second electric machine connected to a second gear unit for driving a second wheel of the vehicle, and the drive axle of the first electric machine is arranged parallel to the drive axle of the second electric machine, and a parking lock device. The parking lock device has a parking lock for the second gear unit and a comparatively simple locking device for the first gear unit. A gear unit element of the second gear unit is connectable to a gear unit element of the first gear unit by the locking device for locking the first gear unit.

10 Claims, 2 Drawing Sheets

(56) References Cited

U.S. PATENT DOCUMENTS

| | | | |
|---|---|---|---|
| 11,198,359 B2* | 12/2021 | Payne | B60K 17/02 |
| 2006/0037792 A1* | 2/2006 | Boss | B60L 3/0061 |
| | | | 180/65.6 |
| 2013/0030636 A1* | 1/2013 | Sugata | B60K 7/0007 |
| | | | 701/22 |
| 2016/0068159 A1* | 3/2016 | Zou | B60W 20/15 |
| | | | 701/22 |

FOREIGN PATENT DOCUMENTS

| | | |
|---|---|---|
| DE | 102018201822 | 8/2019 |
| DE | 102019005151 | 1/2021 |

* cited by examiner

DRIVE ARRANGEMENT FOR A VEHICLE

CROSS REFERENCE TO RELATED APPLICATIONS

This is a U.S. national stage of Application No. PCT/EP2022/067199 filed Jun. 23, 2022. Priority is claimed on German Application No. DE 10 2021 206 734.4 filed Jun. 29, 2021, the content of which is incorporated herein by reference.

BACKGROUND OF THE INVENTION

1. Field of the Invention

The disclosure is directed to a drive arrangement for a vehicle. The drive arrangement comprises a first electric machine connected to a first gear unit for driving a first wheel of the vehicle and a second electric machine connected to a second gear unit for driving a second wheel of the vehicle. In particular, the first electric machine and second electric machine are of the same type, and the drive axle of the first electric machine is arranged parallel to the drive axle of the second electric machine. The drive arrangement further comprises a parking lock device.

The disclosure is further directed to an axle for a vehicle having such a drive arrangement. The disclosure is further directed to a vehicle having such a drive arrangement.

2. Description of the Related Art

Vehicles with an electric machine for each wheel can have torque distributed to the wheels through corresponding control of the electric machines. Therefore, by dispensing with downstream differential gears, a separate parking lock is provided for each wheel. However, such drive arrangements require a large installation space and are expensive and complicated to produce.

An electric drive system for an electrically operated vehicle is known from DE 10 2018 201 822 A1. This electric drive system comprises a first electric machine comprising a second region of the first electric machine, which second region is mechanically connected to a first wheel drive; a first gear unit which is connected to the first wheel drive and to the second region of the first electric machine; a second electric machine comprising a second region of the second electric machine, which second region is mechanically connected to a second wheel drive; a second gear unit which is connected to the second wheel drive and to the second region of the second electric machine; and a common region in which a first region of the first electric machine and a first region of the second electric machine are arranged and which comprises at least one of the following components for the first electric machine and for the second electric machine: an axle bearing, a parking lock device, a cooling water connection, and a speed sensor/bearing sensor arrangement. The parking lock comprises a shared locking pawl actuator which is formed of two parts and which simultaneously engages in the toothed wheels of the two gear units for locking the same.

The complicated construction and large installation space are disadvantageous.

SUMMARY OF THE INVENTION

Therefore, it is one aspect of the present invention to provide a drive arrangement, an axle and a vehicle which are producible in a simple and inexpensive manner and have a small installation space.

It is a further aspect of the present invention to provide an alternative drive arrangement, an alternative axle and an alternative vehicle.

In an aspect, the present invention meets the above-stated objects in a drive arrangement for a vehicle, the drive arrangement comprising:
- a first electric machine which is connected to a first gear unit for driving a first wheel of the vehicle,
- a second electric machine which is connected to a second gear unit for driving a second wheel of the vehicle and, in particular, the first electric machine and second electric machine are of the same type, and
- the drive axle of the first electric machine is arranged parallel to the drive axle of the second electric machine, and a parking lock device.

The invention is characterized in that the parking lock device further comprises
- a parking lock for the second gear unit, and
- a locking device for the first gear unit, a gear unit element of the second gear unit being connectable to a gear unit element of the first gear unit by the locking device for locking the first gear unit.

In one aspect, the above-stated objects are met by the present invention with an axle for a vehicle comprising such a drive arrangement.

In a further aspect, the present invention meets the above-stated objects with a vehicle having such a drive arrangement.

As will become evident as the description proceeds, the terms "parking lock" and "locking device" refer to different devices, particularly with respect to the actuator, component elements and the like. In the claims and in the description, "parking lock" means an apparatus that prevents a parked vehicle from rolling in that a shaft or a gear unit element connected to at least one vehicle wheel is locked relative to a stationary element of the vehicle, for example, a transmission housing or the vehicle chassis. A conventional parking lock with an actuatable pawl and a ratchet wheel cooperating with the latter is so configured and adapted that it can also prevent rolling of a vehicle depending on an inclination of the vehicle even when the pawl and ratchet are in a tooth-on-tooth position. The full locking effect for prevention of rolling occurs when a tooth-to-space position is occupied. Further, a parking lock is mechanically specified in particular such that it does not engage at higher vehicle speeds, generally higher than about 4 to 5 km/h, in that the pawl is repulsed by the ratchet wheel.

In contrast, a "locking device" in the claims and description does not refer to a conventional or known parking lock. On the contrary, a locking device refers to a comparatively simple apparatus, compared to a parking lock, for the mutual rotationally coupled connection of two shafts or gear unit elements.

One of the advantages achieved in this way consists in that a compact drive arrangement with only one parking lock can be provided in a simple and economical manner.

Further features, advantages and embodiments are described in the following or are disclosable thereby.

According to an one aspect of the invention, the parking lock device is formed in such a way that the locking device is not activated until after an activation of the parking lock. Accordingly, the locking device is actuated only after the parking lock has been actuated so that it is not actuated separately before the parking lock. The reliability of the parking lock device is enhanced in this way. The dynamic requirements while a vehicle is stationary, i.e., the absorption of the torque shock as a result of the vehicle possibly still rolling, are accordingly intercepted solely or at least substantially by the parking lock.

According to one aspect of the invention, the parking lock device comprises a rotational movement detection device for detecting a rotational movement of a gear unit element of the second gear unit, which gear unit element cooperates with the parking lock, and/or of a gear unit element of the first gear unit, which gear unit element cooperates with the locking device.

The rotational movement detection device can comprise at least one or more speed sensors. The speed sensors can be provided separately or as wheel speed sensors or ABS sensors of a modern anti-lock braking system which can detect a rotational movement through the vehicle wheels coupled with the respective gear unit elements. The rotor-stator arrangements, for example, of electric machines not having rotation position sensors or, otherwise, also the rotor position sensors provided at electric machines for controlling the stator windings can be used for detecting a rotational movement. For example, a torque shock acting on the engaged parking lock can trigger an activation signal for activating the locking device by a rotational movement detection device.

Further advantageously, the locking device can comprise an actuator. To activate the locking device, the actuator can be formed particularly as an electrically, electromechanically, hydraulically or pneumatically operated actuator.

According to one aspect of the invention, the locking device is configured to connect the two gear unit elements of the first gear unit and second gear unit through control of the actuator of the locking device when the parking lock is already activated and when there is a difference in speed between the two gear unit elements detected by the rotational movement detection device.

In this way, the locking device can be actuated "automatically" in a particularly simple manner when the active parking lock is no longer sufficient for holding the vehicle, for example, on a slope.

According to one aspect of the invention, the locking device comprises a shiftable clutch, particularly a shiftable dog clutch and/or multiple-plate clutch. In case of a dog clutch, it can be formed to be synchronized or non-synchronized. Since, on the one hand, the difference in speed occurring for activating the locking device is greater than zero but, on the other hand, is limited to a few revolutions per minute, a simple and economical technical solution is sufficient in this case in principle. Reference is made to a dog shift or dog clutch of a motorcycle transmission by way of example.

For example, when there is a "parking request", i.e., when a parking lock is activated to engage by a control signal of a parking lock control, and when there is simultaneously a speed signal of the rotational movement detection device that is below a defined threshold speed $n_{max}$, the actuator can receive an actuation signal for closing the rotational driving connection between the first gear unit and second gear unit that is open in this state. The threshold speed $n_{max}$ is dependent on a transmission ratio or a tire diameter of the vehicle and corresponds to a vehicle speed of approximately 5 km/h.

Since the second gear unit, the vehicle wheel connected to the latter, and the rotor of the second electric machine coupled therewith are locked against rotational movement when the parking lock is activated, only one gear unit element of the first gear unit, the vehicle wheel connected to the latter, and the rotor of the first electric machine can rotate and generate a temporally distinctive speed signal greater than zero. Accordingly, there is a difference in speed between the gear unit elements of the first gear unit and the second gear unit. This speed difference accordingly corresponds to the above-mentioned threshold speed $n_{max}$. Therefore, the activation of the locking device can be carried out automatically.

According to one aspect of the invention, the two electric machines are arranged coaxial to one another. This simplifies the construction overall and enables a simple and reliable actuation of the parking lock device.

According to one aspect of the invention, an output gear of the second gear unit is connectable to a shaft of the electric machine of the first gear unit by the locking device. This has the advantage of a reliable locking of the two gear units.

Further important features and advantages of the invention will be apparent from the subclaims, the drawings and the accompanying description of the figures referring to the drawings.

It will be understood that the features mentioned above and those yet to be explained below may be used not only in the stated combinations but also in other combinations or alone without departing from the scope of the present invention.

BRIEF DESCRIPTION OF THE DRAWINGS

Preferred constructions and embodiments of the present invention are shown in the drawings and explained more fully in the following description. Like or similar or similarly operating components or elements are designated by identical reference numerals.

In the drawings.

DETAILED DESCRIPTION OF THE PRESENTLY PREFERRED EMBODIMENTS

Figure 1:
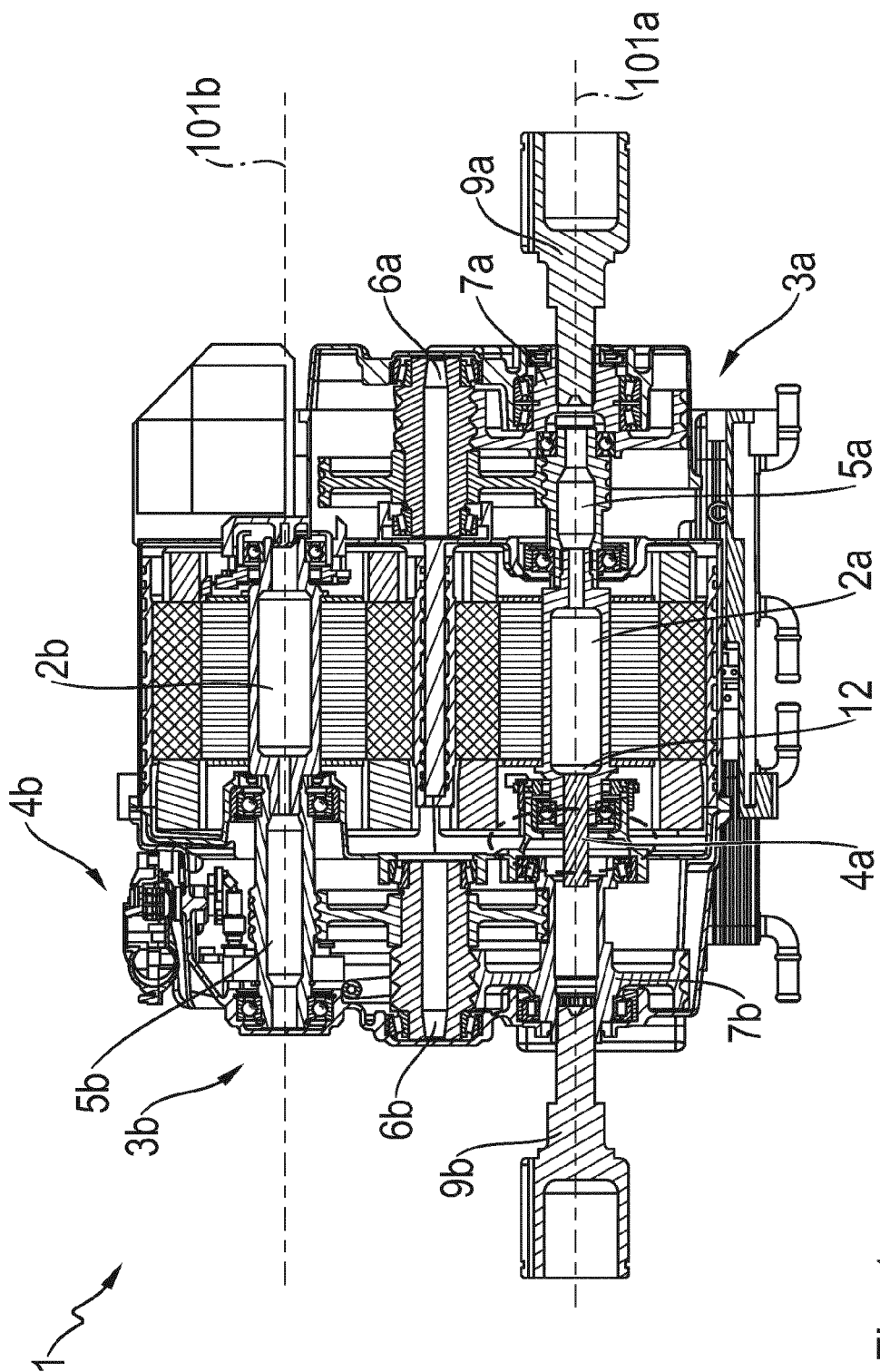
FIG. 1 is a drive arrangement.

FIG. 1 shows a drive arrangement according to an embodiment of the present invention.

Specifically, FIG. 1 shows a drive arrangement 1. The drive arrangement 1 comprises two electric machines 2a, 2b, each of which is connected to a gear unit 3a, 3b, respectively, for transmitting power and torque. The gear units 3a, 3b comprise in each instance an input shaft 5a, 5b, which is connected in each instance to an electric machine 2a, 2b, respectively. The respective input shaft 5a, 5b is connected, respectively, via an intermediate gear 6a, 6b to an output gear 7a, 7b, which is connected in turn to an output shaft 9a, 9b and, lastly, to the drive of a wheel (not shown). The gear unit 3a for the right-hand wheel, referred to hereinafter as right-hand gear unit 3a for the sake of brevity, is arranged in such a way that the axis of rotation of the electric machine 2a, the input shaft 5a of the left-hand gear unit 3a, and the output shaft 9a with output gear 7a lie on a common axis 101a. The gear unit 3 for the left-hand wheel, referred to hereinafter as left-hand gear unit 3b for the sake of brevity, is arranged in such a way that the axis of rotation of the electric machine 2b and the input shaft 5b of the right-hand gear unit 3b lie on an axis 101b, and the output shaft 9b with output gear 7b lie on a common axis. The intermediate gears 6a, 6b of the left-hand gear unit 3a and right-hand gear unit 3b lie on different axes in order to realize identical transmission ratios of gear units 3a and 3b. The gear units 3a, 3b are arranged on different sides of the two electric machines 2a, 2b which are arranged directly adjoining one another at the top and bottom referring to FIG. 1. The gear units 3a, 3b have in each instance a housing (not designated here) which is, in each instance, supported at or fastened to two electric machines 2a, 2b or the housing thereof, respectively.

Figure 2:
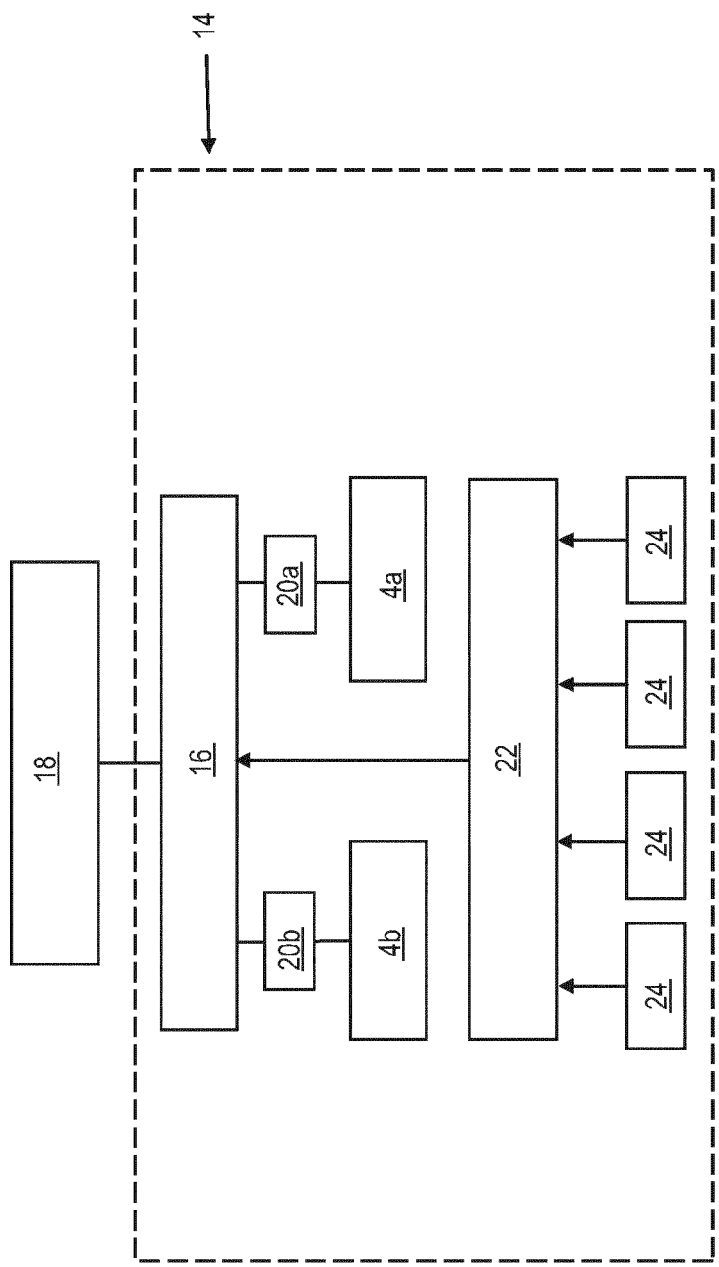
FIG. 2 is a schematic diagram illustrating a parking lock device of the drive arrangement.

There is further arranged an active parking lock 4b for the left-hand gear unit 3b which can engage in the input shaft 5b of the left-hand gear unit 3b substantially on the opposite side of the electric machine 2b in order to lock this left-hand gear unit 3b. As is shown schematically in FIG. 2, the parking lock 4b is a component part of a parking lock device 14 and can be formed in a known manner with an actuator 20b and, further, with a locking pawl, not shown here, for latching in and locking a parking ratchet wheel. The parking lock device 14 further comprises a rotational movement detection device 22 with one or more sensors 24 for detecting a rotational movement of a gear unit element of the second gear unit 3b, which gear unit element cooperates with the parking lock 4b, particularly for detecting a rotational movement of a vehicle wheel connected to it. The sensors 24 can comprise ABS sensors associated with the vehicle wheels and/or rotor position sensors provided at the electric machines 2a, 2b for controlling the stator windings of the electric machines 2a, 2b.

The active parking lock 4b is connected to a parking lock control 16 and can be engaged, for example, based on a desire of the driver and/or on the demand of a higher-level control 18 such as a vehicle control and possibly depending on other conditions, e.g., the vehicle speed. The parking lock control 16 is also a component part of the parking lock device 14.

A switchable locking device 4a, in this case particularly a dog clutch, which can connect the rotor shaft 12 and the output gear 7b, is arranged between the rotor shaft 12 of the electric machine 2a of the right-hand gear unit 3a and the output gear 7b of the left-hand gear unit 3b. The locking device 4a is also a component part of the parking lock device 14. In order to actuate the locking device 4a, a further actuator 28 is provided. Further, the rotational movement detection device 22 with at least one sensor 24 is likewise associated with the locking device 4a. In particular, the rotational movement detection device 22 is configured to detect a rotational movement of a gear unit element of the first gear unit 3a, which gear unit element does not cooperate with the parking lock 4b, and particularly for detecting a rotational movement of a vehicle wheel connected thereto. The locking device 4a is likewise connected to the parking lock control 16 for signal transmission.

The actuation of the locking device 4a will be described by way of example by the following process.

A vehicle is parked on a hill with a 30% grade, for example. The parking lock 4b is actuated at the driver's command by engaging the park position of a selector switch so that the electric machine 2b is locked. If a torque shock, for example, now takes place on the left-hand wheel that is ultimately connected to the electric machine 2a, this torque shock is absorbed by the parking lock 4b and locks the left-hand wheel.

Since the holding force for the vehicle is insufficient on this grade, the right-hand wheel, which is not locked, and the corresponding electric machine 2a rotate together. There is a relative speed between the two electric machines 2a, 2b or between gear unit elements of the two gear units 3a, 3b, respectively. The torque shock and the consequent rotational movement is detected by at least one sensor 24 of the above-mentioned rotational movement detection devices 22.

As a result of the difference in speed now existing between the gear unit elements of the two gear units 3a, 3b, the locking device 4a is activated or actuated by the associated actuator 20a subject to the parking lock control 16 and connects the output gear 7b of the left-hand gear unit 3b for the left-hand wheel to the rotor shaft 12 of the electric machine 2a for the right-hand wheel. The left-hand wheel is accordingly locked directly and the right-hand wheel is locked indirectly via the activated active parking lock 4b by the locking device 4a.

As an alternative to the process described above, the locking device 4a can also be activated already directly after activating the parking lock 4b. A time delay occurring when activating can be less than one second, for example. In particular, it can have a duration of between 200 ms and 800 ms and preferably amounts to about 500 ms. The parking lock 4b absorbs the main component of the kinetic energy of the vehicle. Any remaining, comparatively small residual component of kinetic energy can be absorbed by the locking device 4a. Only a slight difference in speed between the rotating gear unit elements of the two gear units 3a, 3b can occur when the locking device 4a is activated so that there exists at least substantially a speed parity.

In the embodiment presented herein, the two electric machines 2a, 2b are arranged coaxial to one another. If they are not coaxial, i.e., arranged at an offset, the locking device 4a can additionally comprise a shaft in order to compensate for this offset so that output gear 7b and rotor shaft 12 are connectable in the above-described manner by the locking device 4a in spite of a non-coaxial arrangement of the two electric machines 2a, 2b.

To summarize, at least one aspect of the invention provides at least one of the following advantages and/or at least one of the following features:
simple, economical production;
inexpensive axles for vehicles;
compact installation space;
simple, economical assembly.

While the present invention has been described in terms of preferred embodiment examples, it is not limited to these embodiment examples but rather can be modified in a variety of ways.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. A drive arrangement for a vehicle, comprising:
a first electric machine connected to a first gear unit and configured to drive a first wheel of the vehicle;
a second electric machine connected to a second gear unit and configured to drive a second wheel of the vehicle, wherein the first electric machine and second electric machine are of a same type, and wherein a drive axle of the first electric machine is arranged parallel to and offset from a drive axle of the second electric machine; and a parking lock device, comprises:
  a parking lock for the second gear unit, and
  a locking device for the first gear unit, wherein a gear unit element of the second gear unit is connectable to a gear unit element of the first gear unit by the locking device to lock the first gear unit.

2. The drive arrangement according to claim 1, wherein the parking lock device is formed in such that the locking device is not activated until after an activation of the parking lock.

3. The drive arrangement according to claim 1, wherein the parking lock device comprises a rotational movement detection device configured to detect a rotational movement of a gear unit element of the second gear unit, which gear unit element cooperates with the parking lock, and/or of a gear unit element of the first gear unit, which gear unit element cooperates with the locking device.

4. The drive arrangement according to claim 1, wherein the locking device comprises an actuator.

5. The drive arrangement according to claim 4, wherein the locking device is configured to connect the two gear unit elements of the first gear unit and second gear unit through control of the actuator when the parking lock is activated and when there is a difference in speed detected by a rotational movement detection device between the two gear unit elements, the two gear unit elements of the first gear unit and second gear unit.

6. The drive arrangement according to claim 1, wherein the locking device comprises a shiftable clutch.

7. The drive arrangement according to claim 6, wherein the shiftable clutch is a dog clutch and/or a multiple-plate clutch.

8. The drive arrangement according to claim 1, wherein an output gear of the second gear unit is configured for connection to a shaft of the first electric machine of the first gear unit by the locking device.

9. An axle for a vehicle with a drive arrangement comprising:
  a first electric machine connected to a first gear unit and configured to drive a first wheel of the vehicle;
  a second electric machine connected to a second gear unit and configured to drive a second wheel of the vehicle,
  wherein the first electric machine and second electric machine are of a same type, and
  wherein a drive axle of the first electric machine is arranged parallel to and offset from a drive axle of the second electric machine; and
  a parking lock device, comprises:
    a parking lock for the second gear unit, and
    a locking device for the first gear unit,
  wherein a gear unit element of the second gear unit is connectable to a gear unit element of the first gear unit by the locking device to lock the first gear unit.

10. A vehicle with a drive arrangement comprising:
  a first electric machine connected to a first gear unit and configured to drive a first wheel of the vehicle;
  a second electric machine connected to a second gear unit and configured to drive a second wheel of the vehicle,
  wherein the first electric machine and second electric machine are of a same type, and
  wherein a drive axle of the first electric machine is arranged parallel to and offset from a drive axle of the second electric machine; and
  a parking lock device, comprises:
    a parking lock for the second gear unit, and
    a locking device for the first gear unit,
  wherein a gear unit element of the second gear unit is connectable to a gear unit element of the first gear unit by the locking device to lock the first gear unit.

* * * * *